United States Patent

Fudemoto et al.

[15] 3,646,269

[45] Feb. 29, 1972

[54] SYNCHRONIZATION CIRCUIT FOR RECEIVING AND REGENERATING TIMING SIGNALS IN A SYNCHRONIZED DIGITAL TRANSMISSION SYSTEM

[72] Inventors: Isao Fudemoto, Machida-shi; Kiyoshi Tomimori, Kawasaki-shi; Eiichi Nakamura, Yokohama-shi; Yutaka Kimura, Kawasaki-shi, all of Japan

[73] Assignee: Fujitsu Limited, Kawasaki, Japan

[22] Filed: June 18, 1969

[21] Appl. No.: 834,294

[30] Foreign Application Priority Data

June 25, 1968 Japan....................................43/44068

[52] U.S. Cl. ............................178/69.5 R, 307/269 328/72,

[51] Int. Cl........................................................... H04l 7/04

[58] Field of Search ..........................179/15 BS; 178/69.5 R; 325/325; 328/63, 72; 307/208, 269, 246, 294, 293

[56] References Cited

UNITED STATES PATENTS

| | | | |
|---|---|---|---|
| 3,321,579 | 5/1967 | Grisdale | 328/72 |
| 3,461,230 | 8/1969 | Hodge et al. | 178/6.6 DO |
| 3,462,551 | 8/1969 | Fong | 179/15 BS |
| 3,518,377 | 6/1970 | Dworkin | 178/69.5 |

*Primary Examiner*—Robert L. Griffin
*Assistant Examiner*—Donald E. Stout
*Attorney*—Curt M. Avery, Arthur E. Wilfond, Herbert L. Lerner and Daniel J. Tick

[57] ABSTRACT

A control circuit couples the bit synchronization extraction circuit to the phase controlled oscillator of a synchronization circuit and transfers the synchronization component from the extraction circuit to the oscillator to control the phase of the oscillator when the signal-to-noise ratio of the synchronization component is at least at a predetermined level and prevents the transfer of the synchronization component to the oscillator to prevent phase control of the oscillator when the signal-to-noise ratio is below the predetermined level.

5 Claims, 20 Drawing Figures

SYNCHRONIZATION CIRCUIT FOR RECEIVING AND REGENERATING TIMING SIGNALS IN A SYNCHRONIZED DIGITAL TRANSMISSION SYSTEM

DESCRIPTION OF THE INVENTION

The present invention relates to a synchronization circuit. More particularly, the invention relates to a synchronization circuit for receiving and regenerating timing signals in a synchronized digital transmission system, such as a PCM transmission system, or the like.

There are two types of synchronization information or signals in a digital transmission system such as, for example, a PCM transmission system. These types are bit synchronization signals and framing signals. Framing signals are conventionally regenerated from special signals indicating their time slots and pulse number information provided by bit synchronization signals. Consequently, if bit synchronization ceases, even for a brief period, framing is desynchronized. Once the framing is desynchronized, resynchronization requires a comparatively long time, even after bit resynchronization. It is therefore desirable that after instantaneous interruption of digital signals, bit synchronization signals should be maintained for a considerable period of time after the previous bit synchronization signal. When the bit synchronization signals are thus maintained without interruption, framing may be maintained if the phase difference between the correct bit synchronization signal, provided upon bit resynchronization, and the presumed bit synchronization signal is less than 180°.

The principal object of the present invention is to provide a new and improved synchronization circuit.

An object of the present invention is to provide a synchronization circuit which overcomes the disadvantage of known synchronization circuits.

An object of the present invention is to provide a synchronization circuit which provides stable bit synchronization signals from bit synchronization signals preceding an interruption of the pulse train for a considerable period of time after the interruption.

An object of the present invention is to provide a synchronization circuit of simple structure which functions with efficiency, effectiveness and reliability.

In accordance with the present invention, a synchronization circuit comprises a bit synchronization extraction circuit for extracting the synchronization component from a pulse train. A phase controlled oscillator utilizes the synchronization component as a reference phase for uninterruptedly producing bit synchronization signals. Input means supplies a pulse train to the bit synchronization extraction circuit. Output means derives the bit synchronization signals from the phase controlled oscillator. Control means couples the bit synchronization extraction circuit to said phase controlled oscillator for transferring the synchronization component from the extraction circuit to the oscillator to control the phase of the oscillator when the signal-to-noise ratio of the synchronization component is at least at a predetermined level, and to prevent the transfer of the synchronization component to the oscillator to prevent phase control of the oscillator when the signal-to-noise ratio of the synchronization component is below the predetermined level.

The control means may comprise a gate circuit connected between the bit synchronization extraction circuit and the phase controlled oscillator and a control circuit connected to the gate circuit for controlling the condition of conductivity thereof.

The control means may comprise a gate circuit connected between the pulse shaper and the phase controlled oscillator and a control circuit connected to the gate circuit for controlling the condition of conductivity thereof.

The control circuit of the control means may comprise a timer circuit having a short charge time and a long discharge time, an input connected to the input means and an output connected to an input of the gate circuit.

The control circuit of the control means may comprise an envelope detector connected to the output of the bit synchronization extraction circuit and a Schmitt trigger circuit connected between the envelope detector and an input of the gate circuit.

The timer circuit comprises a timing network connected to the input means and a slicer circuit connected to the input means and a slicer circuit connected between the timing network and an input of the gate circuit. The timing network comprises two time constant branches each having a time constant different from the other and connected in parallel with each other and coupling means coupling the time constant branches. One of the time constant branches of the timing network comprises a diode. The coupling means of the timing network comprise diodes. One of the time constant branches of the timing network comprises a discharge capacitor and the other of the time constant branches of the timing network comprises a charge capacitor. The timing network further comprises a load resistor connected in parallel with both time constant branches.

In order that the present invention may be readily carried into effect, it will now be described with reference to the accompanying drawings, wherein.

In the FIGS., the same components are identified by the same reference numerals.

Figure 1:
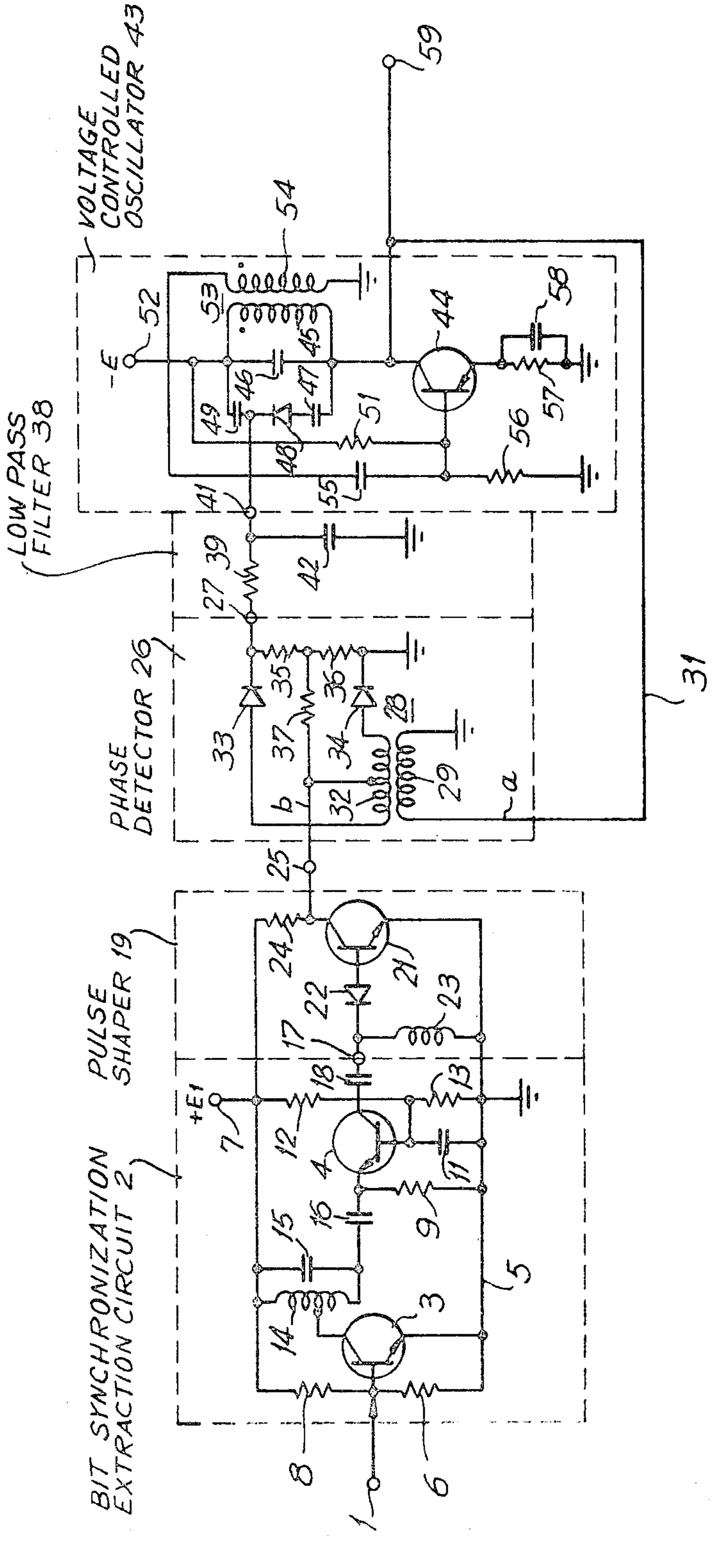
FIG. 1 PRIOR ART
FIG. 1 is a circuit diagram of a known synchronization circuit.

FIG. 1 is a synchronization circuit of known type utilized in PCM transmission systems to maintain framing. In FIG. 1, a PCM signal input terminal 1 is connected to the input of a bit synchronization extraction circuit 2. The bit synchronization extraction circuit 2 comprises a pair of transistors 3 and 4. The emitter electrode of the transistor 3 is connected to ground via a ground lead 5. The base electrode of the transistor 3 is connected directly to the input terminal 1, to ground via a resistor 6 and the lead 5, and to a positive voltage source 7 via a resistor 8.

The emitter electrode of the transistor 4 is connected to ground via a resistor 9 and the lead 5. The base electrode of the transistor 4 is coupled to ground via a capacitor 11 and the lead 5, is connected to the positive voltage source 7 via a resistor 12, and is connected to ground via a resistor 13 and the lead 5. The collector electrode of the transistor 3 is coupled to the emitter electrode of the transistor 4 via a tuning circuit 14, 15 and a capacitor 16.

The tuning circuit 14, 15 comprises an inductor 14 and a capacitor 15, and is tuned to the bit frequency. The collector electrode of the transistor 3 is connected to the tap point of the inductor 14. A common point in the connection between the inductor 14 and the capacitor 15 is connected to the capacitor 16. The collector electrode of the transistor 4 is coupled to an output terminal 17 via a capacitor 18.

The output terminal 17 of the bit synchronization extraction circuit 2 is the input terminal of a pulse shaper 19, which functions to limit the amplitude of the bit synchronization signal extracted by said bit synchronization extraction circuit. The pulse shaper 19 converts the amplitude-limited bit synchronization signal to a rectangular wave. The pulse shaper 19 comprises a transistor 21. The base electrode of the transistor 21 is coupled to the input terminal 17 via a diode 22.

A common point in the connection between the input terminal 17 and the diode 22 is coupled to ground via an inductor 23 and the lead 5. The emitter electrode of the transistor 21 is connected to ground via the lead 5. The collector electrode of the transistor 21 is connected to the positive voltage source 7 via a resistor 24, and to an output terminal 25.

The output terminal 25 of the pulse shaper 19 is the input terminal of a phase detector 26, which functions to provide at an output terminal 27 a DC voltage corresponding to the phase difference between pulses derived at *b* from the output signal at said output terminal and a sine wave output signal fed back at *a*. The phase detector 26 comprises a transformer 28 having a primary winding 29. One end of the primary winding 29 is connected to a feedback lead 31 and the other end of said primary winding is grounded.

The transformer 28 has a secondary winding 32. One end of the secondary winding 32 is coupled to the output terminal 27 via a diode 33. The other end of the secondary winding 32 of the transformer 28 is coupled to ground via a diode 34. The secondary winding 32 has a tap point connected directly to the input terminal 25. A pair of resistors 35 and 36 are connected in series between ground and the output terminal 27. The input terminal 25 and the tap point of the secondary winding 32 are connected in common to a common point in the connection of the resistors 35 and 36 via a resistor 37.

The output terminal 27 of the phase detector 26 is the input terminal of a low-pass filter 38. The low-pass filter 38 comprises a resistor 39 connected between the input terminal 27 and an output terminal 41 and a capacitor 42 connected between the output terminal 41 and ground.

The output terminal 41 of the filter 38 is the input terminal of a voltage controlled oscillator 43. The voltage controlled oscillator 43 comprises a transistor 44. A tuning circuit 45, 46, 47, 48, 49 is connected to the collector electrode of the transistor 44. The tuning circuit comprises an inductor 45, a capacitor 46 connected in parallel with said inductor, and a series circuit arrangement of a capacitor 47, a diode 48 and a capacitor 49 connected in parallel with the capacitor 46 and with the inductor 45. The diode 48 of the tuning circuit 45, 46, 47, 48, 49 is a variable capacity diode which has a capacitance which is varied by the output of the low-pass filter 38. This causes the variation of the frequency of oscillation of the voltage controlled oscillator 43.

The voltage controlled oscillator 43 further comprises a resistor 51 connected between a source 52 of negative voltage and the base electrode of the transistor 44. The negative voltage source 52 is connected to the tuning circuit 45–49. The inductor 45 of the tuning circuit 45–49 is the primary winding of a transformer 53. The transformer 53 has a secondary winding 54 having one end connected to ground and the other end coupled to ground via a capacitor 55 and a resistor 56. The base electrode of the transistor 44 is connected to a common point in the connection of the capacitor 55 and the resistor 56.

The emitter electrode of the transistor 44 is coupled to ground via a resistor 57 and a capacitor 58 connected in parallel with each other. An output terminal 59 is connected to the collector electrode of the transistor 44 and the feedback lead 31 is connected between said collector electrode and the primary winding 29 of the transformer 28. The output signals provided at the output terminal 59 are utilized as the bit synchronization signals.

The phase detector 26, the low-pass filter 38 and the voltage controlled oscillator 43 function together as a phase controlled oscillator. The oscillation frequency and phase of the phase controlled oscillator are controlled by the phase of the output signals of the pulse shaper 19.

In the synchronization circuit arrangement of FIG. 1, the output signal of the bit synchronization extraction circuit 2 provides the reference phase for the phase controlled oscillator 26, 38, 43 by extracting the synchronization signal from the pulse train. This is accomplished by the tuning circuit 14, 15. The synchronization signal thus decreases exponentially when the pulse train is interrupted. The bit synchronization signal component at the time t is therefore defined as $$A(t)\ Ae^{-2\pi(fb)t/Qt}$$

wherein $A(t)$ is the bit synchronization signal component, $fb$ is the bit repetition rate or frequency, $A$ is the component next-preceding the pulse train interruption, $Qt$ is the quality factor of the circuit, and $t$ is the time relative to the instant of interruption of the pulse train.

The input pulse train includes noise and crosstalk, which are constant regardless of the continuation or interruption of the pulse train. There also may be crosstalk from the output to the input within the circuit of FIG. 1. The signal-to-noise ratio of the output signal of the synchronization extraction circuit 2 is thus impaired in accordance with an exponential curve when the pulse train is interrupted. Consequently, a considerably long period of time after the interruption of the pulse train, the output signals of the bit synchronization extraction circuit 2 have a very poor signal-to-noise ratio, and, at worst, only noise is determinable. Therefore, although a phase controlled oscillator having a relatively stable frequency is utilized to provide uninterrupted production of bit synchronization signals at bit intervals determined by the next-preceding pulse train interruption, the advantage of utilizing the phase controlled oscillator cannot be fully realized, due to the fact that the phase is controlled by reference signals of such low quality. A known synchronization circuit, as illustrated in FIG. 1, is not suitable, because it is almost impossible to provide stable bit synchronization when the pulse train is interrupted.

Figure 2:
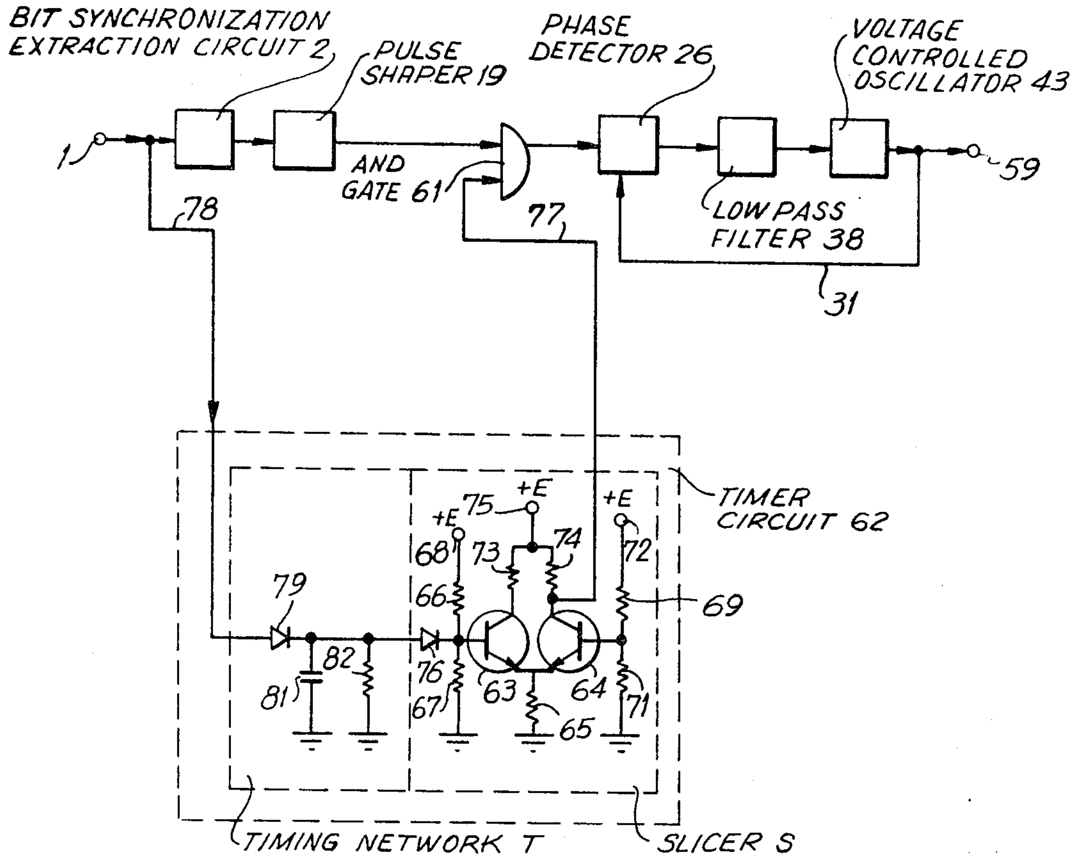
FIG. 2 is a block and circuit diagram of an embodiment of the synchronization circuit of the present invention.
Figure 3A:
FIG. 3A, FIG. 3B, FIG. 3C, FIG. 3D, FIG. 3E and FIG. 3F are a plurality of graphical presentations illustrating signals appearing in the circuit of FIG. 2.
Figure 3B:
Figure 3C:
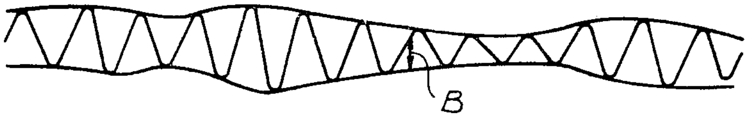
Figure 3D:
Figure 3E:
Figure 3F:

The synchronization circuit of the present invention, as shown in FIG. 2, is the same as the known synchronization circuit shown in FIG. 1, except that it includes an AND-gate 61 connected between the pulse shaper 19 and the phase detector 26 and a timer circuit 62 connected to an input of said AND gate. The timer circuit 62 controls the conductive condition of the AND-gate 61. When the timer circuit 62 produces no output signal, the AND-gate 61 is in its nonconductive condition and prevents the transfer of the output signal of the pulse shaper 19 to the phase detector 26. When the timer circuit 62 produces an output signal, the AND-gate 61 is switched to its conductive condition and transfers the output signal of the pulse shaper 19 to the phase detector 26.

The timer circuit 62 has a short charge time and a long discharge time. The timer circuit 62 comprises a slider S which comprises a pair of transistors 63 and 64 connected in common emitter arrangement. The common emitter connection of the transistors 63 and 64 is connected to ground via a resistor 65. A pair of resistors 66 and 67 are connected in series between a source 68 of positive voltage and ground. A pair of resistors 69 and 71 are connected in series between a source 72 of positive voltage and ground.

The collector electrodes of the transistors 63 and 64 are connected to each other via a pair of resistors 73 and 74 connected in series. A common point in the connection between the resistors 73 and 74 is connected to a source 75 of positive voltage. The base electrode of the transistor 63 is connected to a common point in the connection between the resistors 66 and 67. The base electrode of the transistor 64 is connected to a common point in the connection between the resistors 69 and 71. The input to the slicer S is coupled to the base electrode of the transistor 63 via a slicing diode 76. The output of the slicer S is connected to an input of the AND-gate 61 via a control lead 77.

The slicer S of the timer circuit 62 is coupled to the input terminal 1 of the synchronization circuit via an input lead 78 and a timing network T. The timing network T comprises a diode 79 connected between the input terminal 1 and the slicing diode 76. A capacitor 81 and a load resistor 82 are connected between common points in the connection between the diodes 79 and 76 and ground.

The charge time constant is determined by the internal resistance of the pulse source and the capacitance of the capacitor 81. The discharge time constant is determined by the resistance of the load resistor 82 and the capacitance of the capacitor 81.

Curve A of FIG. 3 shows an input pulse train. Curve B of FIG. 3 shows the output of the timer circuit 62. The timer circuit 62 has a relatively short charge time and a specific discharge time. The discharge time is a suitably determined time constant, so that the signal-to-noise ratio of the output level of the bit synchronization extraction circuit 2, which is $$Ae^{-2\pi(fb)t/Qt}$$

should be maintained above a predetermined level.

When the input pulse train is interrupted for a period equal to the discharge time, the timer circuit 62 does not produce an output signal and the AND-gate 61 is switched to its nonconductive condition and prevents the transfer of the output signal of the pulse shaper 19, shown in curve D of FIG. 3, to the phase detector 26. The output of the AND-gate 61 is shown in curve E of FIG. 3.

The phase of the phase controlled oscillator is controlled by the output of the pulse shaper 19 when the signal-to-noise ratio of the output level of the bit synchronization extraction circuit 2 is equal to or greater than a predetermined level. When the signal-to-noise ratio is less than the predetermined level, the phase of the phase controlled oscillator is not controlled by the output of the pulse shaper 19; the oscillator operates at its own relatively stable frequency of oscillation. Thus, after an interruption of the pulse train, stable bit synchronization is provided for a considerable period of time.

Figure 4:
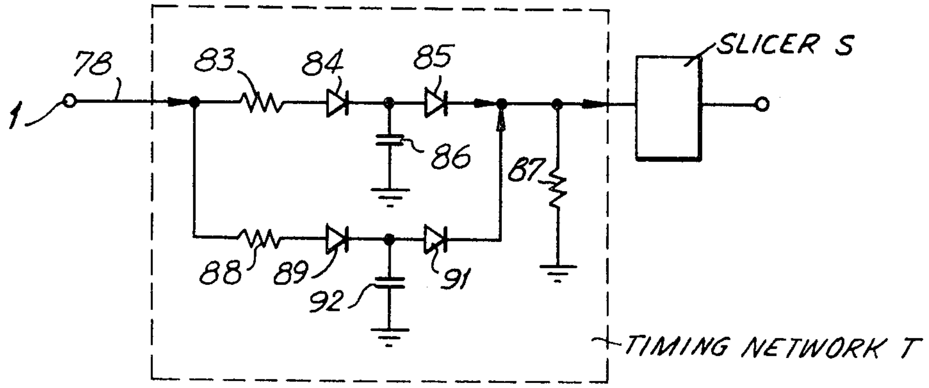
FIG. 4 is a circuit diagram of another embodiment of the timer circuit of FIG. 2.

FIG. 4 is another embodiment of the timer circuit 62 of FIG. 2, and, more specifically, of the timing network T of said timer circuit. In FIG. 4, a resistor 83 of a separating diode 84 is connected in series circuit arrangement with said diode and a coupling diode 85 between the input terminal 1 and the slicer S. A charging capacitor 86 is connected between a common point in the connection between the diodes 84 and 85 and ground. A load resistor 87 is connected between a common point in the connection between the diode 85 and the slicer S and ground. A resistor 88 of a separating diode 89 is connected in series circuit arrangement with said diode and a coupling diode 91. The series circuit arrangement 88, 89, 91 is connected in parallel with the series circuit arrangement 83, 84, 85. A discharging capacitor 92 is connected between a common point in the connection between the diodes 89 and 91 and ground.

When the capacitor 86 functions as a discharge capacitor and the capacitor 92 functions as a charge capacitor, and said capacitors have capacitances of C86 and C92, respectively, said capacitances have the relation $$C86 > C92.$$

If the resistances of the resistors 83, 87 and 88 are R83, R87 and R88, respectively, $$R83 = R88$$

Since the resistances of the diodes 84 and 89 are substantially equal.

When a signal of the type illustrated in curve A of FIG. 6 is supplied to the input terminal 1 of FIG. 4, the voltage waveform across the capacitor 92 becomes that shown in curve B of FIG. 6, and said capacitor is charged with a charge time constant R88C92. The voltage waveform across the capacitor 86 becomes that shown in curve C of FIG. 6, and said capacitor is charged with a charge time constant R83C86.

Since the terminal voltages of the capacitors 86 and 92 are coupled to the load resistor 87 via the diodes 85 and 91, discharge occurs from the capacitor at the higher voltage side of the terminal voltages of said capacitors to said load resistor, whereas discharge does not occur from the lower voltage side. Consequently, only the higher potential sides of the voltages of the two capacitors 86 and 92 appear across the load resistor 87, as shown in curve D of FIG. 6.

The waveforms of the charge time constant R88C92 and the discharge time constant R87C86 are therefore obtained. When said waveforms are sliced by the slicer S, the timer circuit 62 has a short operation time and a long recovery time. The operation time and the recovery time are set independently of each other. The short operation time and long recovery time are illustrated in curve E of FIG. 6.

Figure 5:
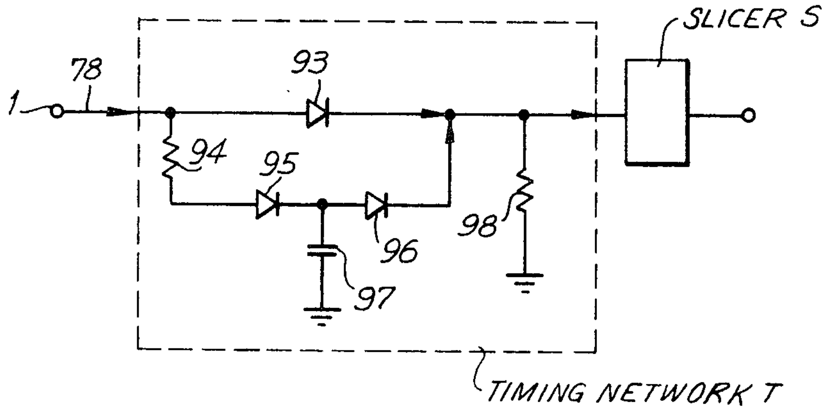
FIG. 5 is a circuit diagram of still another embodiment of the timer circuit of FIG. 2.
Figure 6A:
FIG. 6A, FIG. 6B, FIG. 6C, FIG. 6D and FIG. 6E are a plurality of graphical presentations illustrating signals appearing in the circuit of FIG. 4.
Figure 6B:
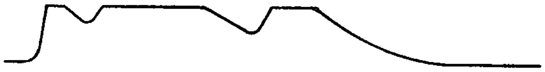
Figure 6C:
Figure 6D:
Figure 6E:
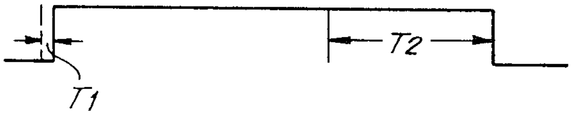
Figure 7A:
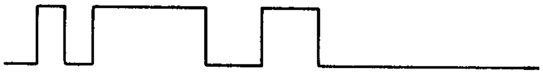
FIG. 7A, FIG. 7B, FIG. 7C and FIG. 7D are a plurality of graphical presentations illustrating signals appearing in the circuit of FIG. 5.
Figure 7B:
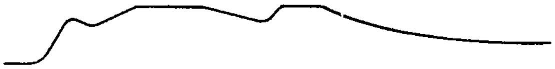
Figure 7C:
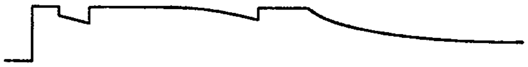
Figure 7D:
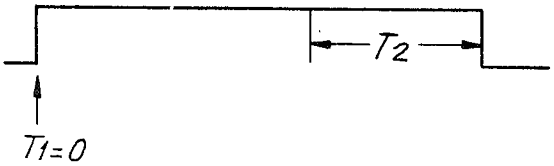

FIG. 5 is another embodiment of the timer circuit 62 of FIG. 2, and, more specifically, of the timing network T of said timer circuit. In FIG. 5, a coupling diode 93 is connected between the input terminal 1 and the slicer S. A resistor 94 of a separating diode 95 is connected in series circuit arrangement with said diode and a coupling diode 96.

The series circuit arrangement 94, 95, 96 is connected in parallel with the diode 93. A discharging capacitor 97 is connected between a common point in the connection between the diodes 95 and 96 and ground. A load resistor 98 is connected between a common point in the connection between the diode 93 and the slicer S and ground.

As indicated in FIG. 7, the charge time constant is selected as zero. That is, when the capacitance of the capacitor 92 of FIG. 4 is set to zero, the diodes 89 and 91 of FIG. 4 may be replaced by the single diode 93 of FIG. 5. The input pulse train of FIG. 5 is shown in curve A of FIG. 7. The voltage waveform across the capacitor 97 is shown in curve B of FIG. 7. Curve C of FIG. 7 illustrates the voltage waveform applied to the load resistor 98.

The voltage waveform applied to the load resistor 98 is provided by coupling the input signal waveform, shown by curve A of FIG. 7, with the voltage waveform across the capacitor 97, as shown by curve B of FIG. 7, via the diodes 93 and 96. As in the embodiment of FIG. 4, the waveform is at the higher voltage side between the input signal and the output of the timing network T. When this waveform is sliced by the slicer S, timing pulses, as illustrated in curve D of FIG. 7, are provided. The timing pulses have an operation time of substantially zero and a recovery time in direct proportion to R98C97.

Figure 8:
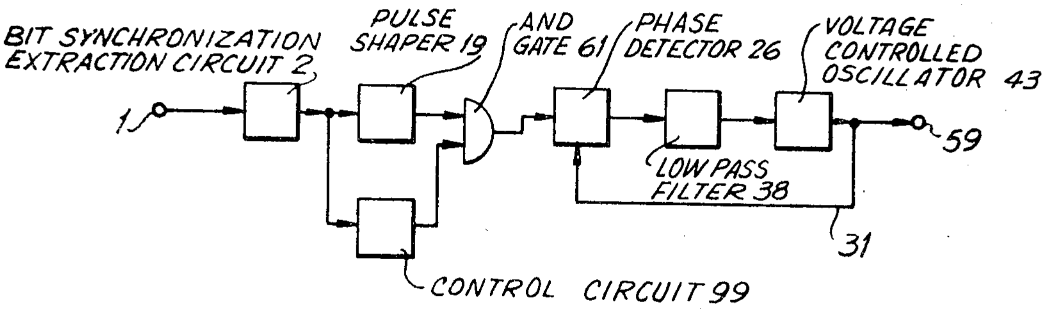
FIG. 8 is a block diagram of another embodiment of the synchronization circuit of the present invention.

FIG. 8 illustrates another embodiment of the synchronization circuit of the present invention. In the embodiment of FIG. 2, the output level of the bit synchronization extraction circuit 2 is determined by conversion to the duration of interruption of the pulse train. In the embodiment of FIG. 8, however, the output level is determined directly.

In the embodiment of FIG. 8, the timer circuit 62 is replaced by a control circuit 99. The control circuit 99 comprises an envelope detector and a Schmitt trigger circuit, each well known. The envelope detector of the control circuit 99 detects the output level of the bit synchronization extraction circuit 2, shown in curve C of FIG. 3, and determines if said output level is above or below the predetermined envelope level, at which the signal-to-noise ratio corresponds to a predetermined magnitude. This envelope level is shown at B in curve C of FIG. 3.

The Schmitt trigger circuit of the control circuit 99 operates in accordance with the result of the envelope detection. The output of the Schmitt trigger circuit controls the conductivity condition of the AND-gate 61. The operation of the AND-gate 61 and its effect on the synchronization circuit of FIG. 8 is similar to those of FIG. 2.

While the invention has been described by means of specific examples and in specific embodiments, we do not wish to be limited thereto, for obvious modifications will occur to those skilled in the art without departing from the spirit and scope of the invention.

We claim:

1. A synchronization circuit, comprising a bit synchronization extraction circuit for extracting the synchronization component from a pulse train;

a pulse shaper connected to the bit synchronization extraction circuit for limiting the amplitude of the synchronization component and converting the synchronization component to a rectangular wave;

a gate circuit connected to the pulse shaper;

a phase detector connected to the gate circuit for detecting the phase difference between the output of the gate circuit and bit synchronization signals and producing a voltage corresponding to the phase difference;

a low-pass filter connected to the phase detector;

a voltage controlled oscillator connected to the low-pass filter for producing the bit synchronization signals, said bit synchronization signals having frequencies corresponding to the output voltage of the low-pass filter; and control means controlling the gate circuit for transferring said synchronization component from said pulse shaper to said phase detector when the amplitude of said synchronization component is at least at a predetermined level, and preventing the transfer of said synchronization component to said phase detector when the amplitude of said synchronization component is below said predetermined level, said control means comprising a timing network having a short charge time and a long discharge time, and a slicer for comparing the output level of the timing network with said predetermined level, said timing network comprising first and second time constant branches, the first time constant branch having a larger time constant than the second time constant branch and connected in parallel with the second time constant branch and coupling means coupling said first and second time constant branches.

2. A synchronization circuit as claimed in claim 1, wherein the second time constant branch of said timing network comprises a diode.

3. A synchronization circuit as claimed in claim 1, wherein the coupling means of said timing network comprise diodes.

4. A synchronization circuit as claimed in claim 1, wherein the first time constant branch of said timing network comprises a discharge capacitor and the second time constant branch of said timing network comprises a charge capacitor.

5. A synchronization circuit as claimed in claim 1, wherein said timing network further comprises a load resistor connected in common with both time constant branches.

* * * * *